(12) United States Patent
Richter

(10) Patent No.: US 8,351,723 B2
(45) Date of Patent: Jan. 8, 2013

(54) METHODS AND APPARATUS FOR GENERATING AND USING VISUAL ERROR WEIGHTS

(75) Inventor: Thomas Richter, Stuttgart (DE)

(73) Assignee: Accusoft-Pegasus, Tampa, FL (US)

( * ) Notice: Subject to any disclaimer, the term of this patent is extended or adjusted under 35 U.S.C. 154(b) by 959 days.

(21) Appl. No.: 12/411,159

(22) Filed: Mar. 25, 2009

(65) Prior Publication Data

US 2010/0246986 A1 Sep. 30, 2010

(51) Int. Cl.
*G06K 9/36* (2006.01)
*G06K 9/46* (2006.01)

(52) U.S. Cl. .................................................. 382/248

(58) Field of Classification Search .................. 382/232, 382/239, 240, 244–246, 248, 250–253; 375/240.16, 375/240.24, 240.27, 316, 324–326, 346; 345/589, 600; 358/3.03, 3.04
See application file for complete search history.

(56) References Cited

U.S. PATENT DOCUMENTS

| | | | | |
|---|---|---|---|---|
| 5,432,893 A * | 7/1995 | Blasubramanian et al. | .. | 345/600 |
| 6,154,572 A * | 11/2000 | Chaddha | ........................ | 382/253 |
| 6,563,957 B1 * | 5/2003 | Li et al. | ........................ | 382/252 |
| 6,650,782 B1 * | 11/2003 | Joshi et al. | ..................... | 382/239 |
| 7,308,146 B2 * | 12/2007 | Becker et al. | ................. | 382/233 |
| 7,613,352 B2 * | 11/2009 | Mizuno | ......................... | 382/240 |
| 8,036,313 B2 * | 10/2011 | Zhou et al. | .................... | 375/316 |
| 2010/0246986 A1 * | 9/2010 | Richter | ......................... | 382/248 |

OTHER PUBLICATIONS

Daly, "Application of a noise-adaptive contrast sensitivity function to image data compression", SPIEE, vol. 29, No. 8, pp. 977-987, Aug. 1990.
N. Otsu, "A Threshold Selection Method from Gray-Level Histograms", IEEE Transactions on Systems, Man, and Cybernetics, vol. SMC-9, No. 1, pp. 62-66, Jan. 1979.
R.M. Haralick, S.R. Sternberg, X. Zhuang, "Image Analysis Using Mathematical Morphology", IEEE Transactions on Pattern Analysis and Machine Intelligence, vol. PAMI-9, No. 4, pp. 532-550, Jul. 1987.
S.R. Sternberg, "Grayscale Morphology", Computer Vision, Graphics and Image Processing, vol. 35, No. 3, pp. 333-355, Sep. 1986.
A. Morales, R. Acharya, and S.J. Ko, "Morphological Pyramids with Alternating Sequential Filters", IEEE Transactions on Image Processing, vol. 4, No. 7, pp. 965-977, Jul. 1995.

(Continued)

*Primary Examiner* — Amir Alavi
(74) *Attorney, Agent, or Firm* — Straub & Pokotylo; Michael P. Straub; Stephen T. Straub

(57) ABSTRACT

A low complexity visual masking method used as part of an image encoding process is described. The method is suitable for use in JPEG2000 image compression systems. Control weights used for rate allocation are generated based on integer order moments of wavelet transformed coefficients corresponding to a codeblock. The novel rate allocation weight generation method can, and in some embodiments is, combined with an apriori rate allocation algorithm, where allocation of bits to different portions of images is controlled as a function of one or more generated weights. The methods and apparatus of the present invention have the effect of increasing errors in busy areas of an image where they tend to be less noticeable and allocating a higher number of bits to less busy areas than some other systems, e.g., systems which attempt to minimize a mean squared error under a constraint of a user selected output rate.

18 Claims, 4 Drawing Sheets

OTHER PUBLICATIONS

J. Gil and R. Kimmel, "Efficient Dilation, Erosion, Opening, and Closing Algorithms", IEEE Transaction on Pattern Analysis and Machine Intelligence, vol. 24, No. 12, pp. 1606-1617, Dec. 2002.

J. Gil and M. Werman, "Computing 2-D Min, Median, and Max Filters", IEEE Transaction on Pattern Analysis and Machine Intelligence, vol. 15, No. 5 pp. 504-507, May 1993.

D.S. Bloomberg, "Multiresolution Morphological Approach to Document Image Analysis", ICDAR, pp. 1-12, 1991.

Y.M.Y. Hasan and L.J. Karam, "Morphological Text Extraction from Images", IEEE Transactions on Image Processing, vol. 9, No. 11, pp. 1978-1983, Nov. 2000.

M. Cumplido, P. Montolio, and A. Gasull, "Morphological Preprocessing and Binarization for OCR Systems", in Mathematical Morphology and Its Applications to Signal Processing, P.A. Margos, R.W. Schafer, and M.A. Butt, Eds., pp. 393-400, Springer, 1996.

I. Pitas, "Fast Algorithms for Running Ordering and Max/Min Calculation", IEEE Transactions on Circuit and Systems, vol. 36, No. 6, pp. 795-804, Jun. 1989.

E. Urbach and M. Wilkinson, "Efficient 2-D Grayscale Morphological Transformations With Arbitrary Flat Structuring Elements", IEEE Transactions on Image Processing, vol. 17, No. 1, pp. 1-8, Jan. 2008.

Zeng et al., "Point-wise extended visual masking for JPEG-2000 Image Compression", IEEE Proc. of Intl. Conference on Image Processing, vol. 1, pp. 657-660, (2000).

Taubman, "High Performance Scalable Image compression with Ebcot", Proceedings of the IEEE Intl. Conf. on Image Processing, vol. 3, pp. 344-348, 1999.

Watson et al., "Visibility of Wavelet Quantization Noise", IEEE Transactions on Image Processing, vol. 6, No. 8, pp. 1164-1175, Aug. 1997.

Mazzarri et al., "Perceptual Embedded Image Coding Using Wavelet Transforms", Proc. IEEE Intl. Conference Image Processing, vol. 1, pp. 586-589, 1995.

Hontsch et al., "APIC: Adaptive Perceptual Image Coding Based on Subband Decomposition with Locally Adaptive Perceptual Weighting", Proc. of Intl. Conf. on Image Proc. 1997, vol. 1, pp. 37-40, 1997.

Chou et al., "A Perceptually Tuned Subband Image Coder Based on the Measure of Just-Noticeable-Distortion Profile", IEEE Transactions on Circuits and Systems for Video Technology, vol. 5, No. 6, pp. 467-476. Dec. 1995.

Ferwerda et al., "A Model of visual Masking for Computer Graphics", Proc. SIGGRAPH '97, pp. 143-152, 1997.

Mallat, "A Theory for Multiresolution Signal Decomposition: The Wavelet Representation", IEEE Transactions on Pattern Analysis and Machine Intelligence, vol. 11, No. 7, pp. 674-693, Jul. 1989.

Sharifi et al., "Estimation of Shape Parameter for Generalized Gaussian Distributions in Subband Decompositions of Video", IEEE Transactions on Circuits and Systems for Video Technology, vol. 5, No. 1, pp. 52-56, Feb. 1995.

Wang et al., "Image Quality Assessment: From Error Visibility to Structural Similarity", IEEE Transactions on Image Processing, vol. 13, No. 4, pp. 600-612. Apr. 2004.

Wang et al., "Multi-Scale Structural Similarity for Image Quality Assessment", IEEE Asilomar Conference on Signals, Systems and Computers, pp. 1398-1402, 2003.

Grottke et al., "Apriori Rate Allocation in Wavelet-based Image Compression", Proc. of AXMEDIX 2006, pp. 329-336, 2006.

Wu et al., "Rate-Constrained Picture-Adaptive Quantization for JPEG Baseline Coders", ICASSP-93, vol. 5, pp. V-389-V392, 1993.

Taubman, "High Performance Scalable Image Compression with EBCOT", IEEE Transactions on Image Processing, vol. 9, No. 7, pp. 1158-1170, 2000.

* cited by examiner

METHODS AND APPARATUS FOR GENERATING AND USING VISUAL ERROR WEIGHTS

FIELD OF THE INVENTION

The present invention relates to image encoding and, more particularly, to methods and apparatus for generating and using visual error weights, corresponding to portions of an image, in controlling image encoding, e.g., JPEG-2000 compliant image encoding.

BACKGROUND

The aim of rate allocation of an image compression codec is to find the coding parameters that optimize the image quality for a given target size, or to minimize the target size for a selected quality. While it is straightforward to define the size of an encoded image, the definition of "image quality" and thus of a quality metric is much harder. The mean squared error between the original and the reconstructed image (MSE) is the most popular metric, but it is also known to be only a poor model for visual significance.

One known technique for encoding images is the JPEG 2000 image encoding format described in ISO/IEC document 15444-1. The JPEG2000 image compression algorithm uses the wavelet transformation as linear decorrelation filter and the EBCOT ("Embedded Bitplane Coding by Truncation") algorithm for rate allocation.

In generating an image to JPEG 2000 format, e.g., during JPEG 2000 encoding the wavelet transform step generates a set of wavelet transformed coefficients describing the image. These wavelet transformed coefficients, in the form of values, are partitioned spatially into subsets called codeblocks. Each codeblock comprises a rectangular array of coefficient values. The wavelet transformed coefficients of a single codeblock all belong to a single contiguous subrectangle of the image and all belong to a single frequency sub-band generated by the applied wavelet transform. This frequency sub-band (and hence the corresponding code-block) corresponds to one of four specific types "flavors" (LL, LH, HL, or HH) according to the formulae, e.g., filter, with which it is generated by the wavelet transform. Information regarding which of the four possible filters which were used to generate a codeblock may be made available for use in later processing of the wavelet transformed coefficients corresponding to the generated codeblock as part of an encoding process. LL corresponds to a Low-pass horizontal, Low-pass vertical sub-band. LH corresponds to a Low-pass horizontal, High-pass vertical sub-band. HL corresponds to a High-pass horizontal, Low-pass vertical sub-band. HH corresponds to a High-pass horizontal, High-pass vertical sub-band.

Then next step in JPEG-2000 coding converts the real-valued wavelet transformed coefficients into integer values by a process called quantization. Quantization can be described as a process that maps each value in a subset of the real line to a particular value in that subset. In JPEG 2000, quantization is used to replace each real-valued wavelet coefficient by an integer-valued quantized wavelet transformed coefficient. The set of integer-valued quantized wavelet transformed coefficients are then input to the EBCOT for rate allocation and encoding. In JPEG 2000, the EBCOT algorithm measures the rate-distortion curve for all codeblocks. Distortion is usually defined as mean squared error (MSE), and rate is the number of bits required to encode the data. In such a system, the MSE is used to measure the error that results if less than all of the bits of all of the quantized wavelet transformed coefficients of a codeblock are provided to a decoder relative to the decoding result that would be achieved if all of the bits of all of the quantized wavelet transformed coefficients corresponding to a codeblock were made available to a decoder. Selecting all those bitplanes for encoding whose slope in a rate distortion curve is steeper than a given threshold is equivalent to a (discrete) Lagrangian optimization process that selects the minimal mean squared error under the constraint of a user selected output rate. Due to the discrepancy between MSE used to control encoding and the perceived visual quality, reconstructed images sometimes show annoying artifacts.

Various attempts at improving upon the MSE approach have been limited in their success for a variety of reasons. Some approaches have attempted to make modifications to the encoding process using fractional moments which can be very computationally complex to determine. One such fractional moment based approach described in D. Taubman: "*High performance scalable image compression with EBCOT*", IEEE Transactions on Image Processing, Vol. 9 No. 7, pp. 1151-1170, (2000) multiplies the MSE metric used in the EBCOT framework by a masking factor which is generated and used on a per codeblock basis. However, the computation of the fractional moment is a complex and time-consuming operation thereby significantly reducing the usefulness of such an approach.

More advanced approaches to improve coding have attempted to adjust quantizer bucket size dynamically on a per-coefficient basis but such approaches can be complex to implement, are incompatible with the JPEG2000 baseline, and are thus only available within part 2 of the JPEG2000 standard even if one is willing to accept the additional complexity associated with such a technique.

In view of the above, it should be appreciated that there is a need for improved methods of implementing visual masking and/or methods of controlling rate allocation as part of an image encoding process. It is desirable that at least some methods could be used with JPEG2000 encoding and/or other types of encoding which support use of an error metric such as an MSE in controlling the encoding process to achieve a desired coding rate or to satisfy a coding target size constraint. It would be highly desirable if the methods could take advantage of variations in an image at the codeblock level and could be implemented without adding a significant amount of complexity to the encoding process.

SUMMARY OF THE INVENTION

The present application is directed to low complexity visual masking methods and apparatus suitable for use in JPEG2000 image compression systems. In some embodiments, the visual masking techniques are implemented as part of an encoder that generates JPEG-2000 compliant bit-streams.

In accordance with the invention one or more visual masking control weights, also referred to herein as visual error weights, are generated based on second order or higher moments of wavelet coefficient values and/or the average absolute values of wavelet coefficient values corresponding to a portion of a codeblock. The generated visual error weights are used, e.g., to control encoding to achieve a desired target rate and/or to satisfy a target size constraint while achieving optimal visual quality and staying compatible to the compression standard. While the method can be used on a per codeblock basis, it is readily adaptable to other subdivisions of the data. In various embodiments, the method is used to generate visual masking weights on a per segment basis where a segment is a sub-portion of a code block, e.g., with a codeblock including a plurality of segments.

In some embodiments, an integer order moment used to determine a visual error weight for a segment is generated by computing an average from two or more intermediate values corresponding to the segment which have been generated by raising wavelet transformed coefficients of the segment to an integer power. Alternatively the integer order moment may be generated by raising the absolute values of each of a plurality of coefficient values from the segment to an integer power and taking an average of the resulting intermediate values. All or a plurality of the coefficient values of a codeblock may be used in generating the integer order moment corresponding to the segment which is to be used in determining the weighting factor. Since the computation of the integer order moments of the codeblock is relatively simple, it does not add a great degree of complexity to the encoding process.

In some embodiments, in addition to the integer order moment value for a segment, a first order mean is generated. In some embodiments the first order mean is generated by summing the absolute value of the wavelet transformed coefficients of a segment and then determining the average of the summed values. Depending on the embodiment all or a portion of the wavelet coefficient transform coefficients of a codeblock may be used in generating the first order mean.

The integer order moment alone or in combination with the first order mean of a segment are used to access a table and identify a corresponding visual error weight to be used for encoding the corresponding segment. A filter value may, optionally, also be used as part of the index into the table of visual error weights with different sets of visual error weights being used for different ones of the filter bands which may be used to generate wavelet transformed coefficients of a codeblock. In some embodiments the table of visual error weights is predetermined, e.g., based on empirical measurements and/ or statistical analysis of a variety of images.

Through the use of the integer order moment and/or first order mean to determine a visual error weight, the invention provides a relatively low complexity method of generating visual error weights, on a per segment basis, which can take into consideration the activity and/or variance within a segment of a codeblock.

The visual error weight generation method of the present invention can be combined with an MSE controlled encoding method to provide encoding rate control. In some embodiments an MSE corresponding to an image segment being encoded is modified by the visual error weight generated in accordance with the invention and then used to control an encoding module.

Through the use of the per segment visual error weight, greater allocation of coding bits can be applied to image areas which are generally more consistent, e.g., less busy, with more busy image segments being allocated fewer bits then would be allocated for the segment as compared to the case where an unweighted MSE was used.

This has the effect of hiding coding errors in busy or active image regions while reducing the number of coding errors which would otherwise be included in less busy, e.g., relatively consistent image regions. This approach to hiding coding errors takes advantage of the human visual systems tendency to ignore errors in busy image regions.

The novel visual error weight generation method can be, and in some embodiments is, combined with an apriori rate allocation algorithm, where, for example, the integer moments measured on the codeblock can be used to drive an apriori rate allocation algorithm that provides early-out conditions for the EBCOT, and hence speeds up encoding, in addition to allocation of bits to different portions of images controlled as a function of one or more of the generated weights. In one particular exemplary JPEG2000 embodiment, a conventional MSE is weighted by the visual error weight to generate a weighed MSE (WMSE) which is generated on a per segment basis. The WMSE generated in accordance with the present invention is then used in place of the MSE used in an EBCOT framework of an encoder generating JPEG2000 compliant bitstreams.

In one particular embodiment the image processing method includes: 1) performing a wavelet transformation on a data representing an image to generate wavelet transformed coefficients, 2) separating the wavelet transformed coefficients into codeblocks; and 3) codeblock processing with the output of the codeblock processing being a set of encoded image data, e.g., coded bits, representing the image.

The codeblock processing which is performed, in the exemplary embodiment, on a per codeblock basis, includes:
  i) generating from the wavelet transformed coefficients corresponding to the codeblock being processed, one or more integer order moments corresponding to the codeblock being processed, e.g., a second or higher order integer moment and, in some embodiments, a first order integer moment, e.g., mean of the absolute values of the wavelet transformed coefficients, corresponding to the codeblock being processed;
  ii) generating a visual weight to be used for the codeblock being processed by using the generated integer order moments corresponding to the codeblock to identify a corresponding visual weight value in a lookup table of visual weights to be used to control encoding;
  iii) quantizing the wavelet transformed coefficients corresponding to the codeblock being processed; and
  iv) encoding the codeblock being processed as a function of the visual weight generated from the integer order moments with the visual weight being used as part of the encoding process to control bit allocation.

In some embodiments the encoding as a function of the generated visual error weight is performed using an EBCOT encoding method and includes one or more of the following steps:
  separating the codeblock into data segments corresponding to fractional bitplanes;
  for each data segment performing the steps:
    i) determining a mean squared error in encoded image quality attributable to the data segment corresponding to the fractional bit plane being encoded;
    ii) entropy coding the quantized wavelet transformed coefficients included in the data segment corresponding to the fraction bitplane being encoded; and
  controlling which entropy encoded data bits are included in the encoded output bitstream representing the image as a function of a weighted MSE.

In some embodiments, the weighted MSE is generated based on the visual weight generated from the integer order moments in accordance with the invention, a filter weight which is a function of the inverse impulse response of a wavelet filter used to generate the codeblock of wavelet transformed coefficients being encoded, and a contrast sensitivity weight. Through the use of the weight as a function of the integer order moments, greater coding emphasis than would be achieved without the use of the visual error weight is placed on low activity regions with lower emphasis on high activity regions. Use of the contrast scale factor can, and in some embodiments is, used to place greater emphasis on those wavelet bands the eye is most sensitive to in terms of bit allocation than would be provided without use of the weight.

In this manner, there is a reduction in coding emphasis in regions where errors are hard to perceive and an increase in coding emphasis where coding errors are more likely to be perceived.

The methods and apparatus of the present invention have the effect, under a constraint of a user selected output rate, of increasing errors in busy areas of an image where they tend to be less noticeable and allocating a higher number of bits to less busy areas than some other systems, e.g., systems which simply attempt to minimize a mean squared error.

Numerous additional features, benefits and possible embodiments which use one or more of the methods and apparatus of the present invention are discussed in the detailed description which follows.

DETAILED DESCRIPTION

The present application is directed to low complexity visual masking methods and apparatus suitable for use in JPEG2000 image compression systems. In some embodiments, the visual masking techniques are implemented as part of a JPEG-2000 compliant encoder.

Figure 1:
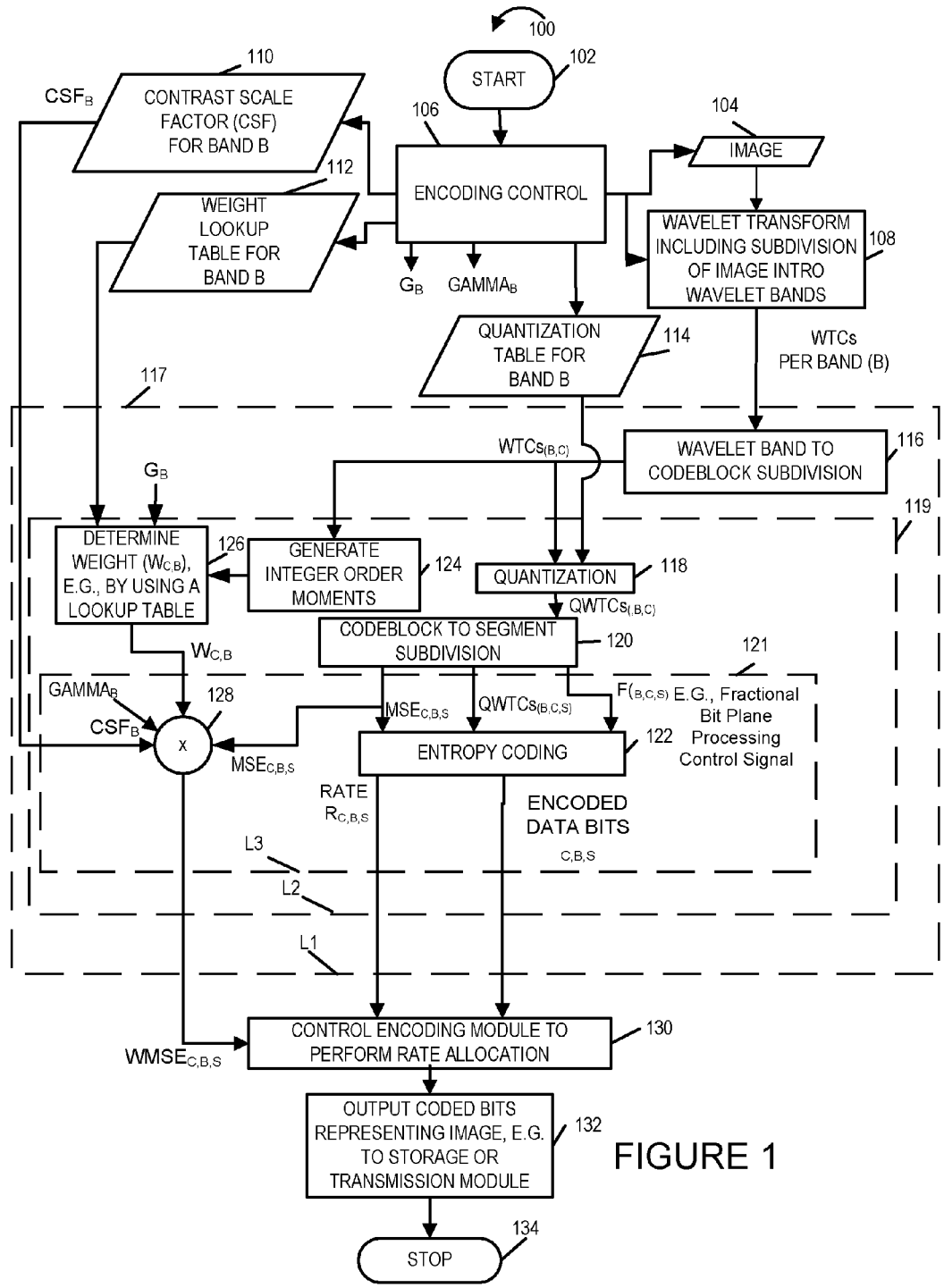
FIG. 1 illustrates a method of generating visible error weights and encoding an image in accordance with the present invention.

FIG. 1 illustrates an exemplary encoding method 100 implemented in accordance with the invention. The method is compatible with the JPEG-2000 standard. It is particularly well suited for use with gray scale images and can take advantage of variations within a codeblock with greater bit allocation emphasis being placed on less active image regions than image regions which are more active.

Figure 3:
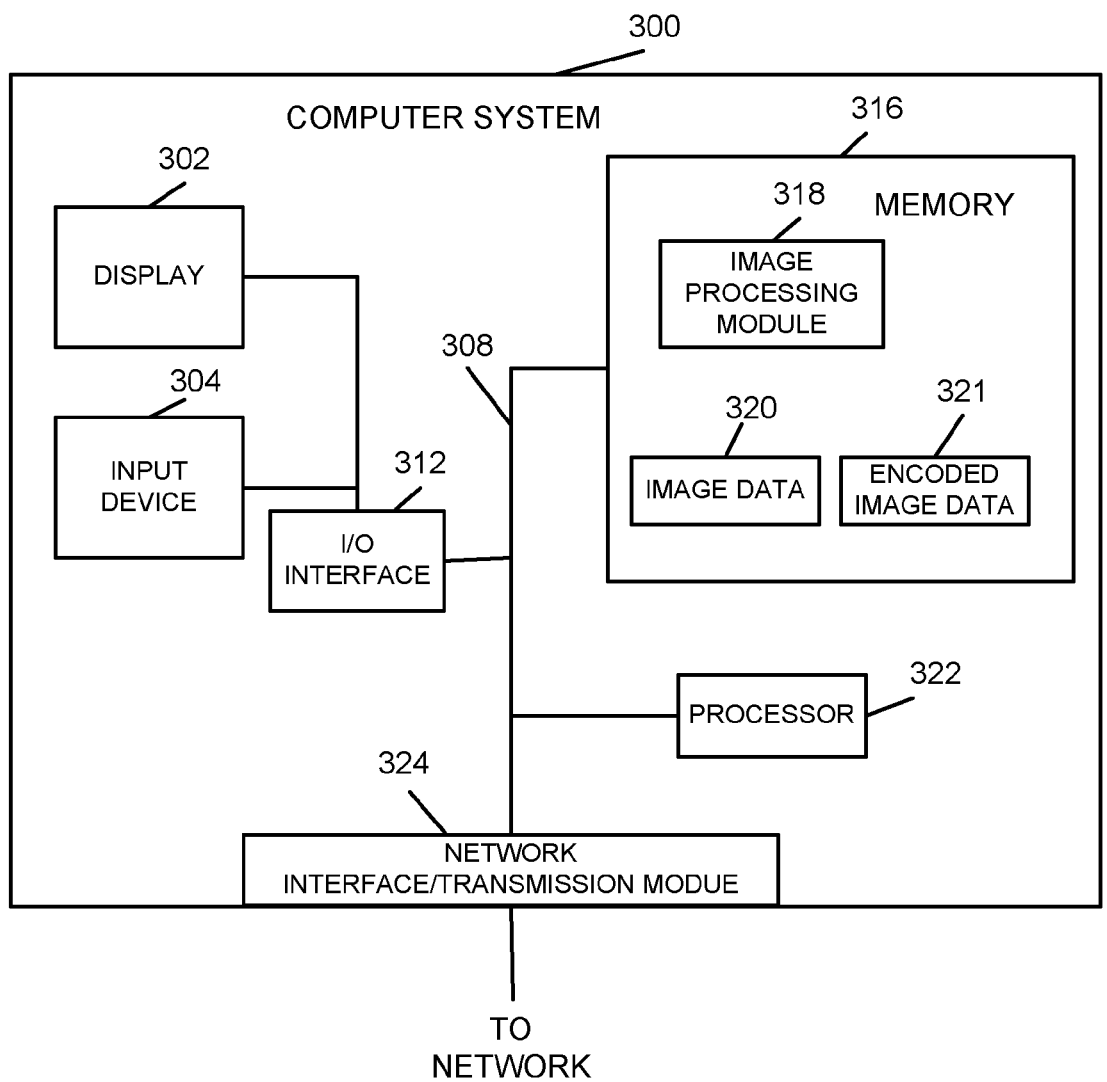
FIG. 3 illustrates a computer system which can, and in some embodiments is, used to implement the methods of FIGS. 1 and 2.

The method 100 begins in start step 102 wherein the system implementing the coding method, e.g., a computer system such as the one shown in FIG. 3, is initialized and one or more modules corresponding to the method 100 begin being executed by a processor used to implement the method. Operation proceeds from start step 102 to encoding control step 106 which is responsible for controlling the supply of the digital image data 104, e.g., in the form of a set of grayscale pixel values, to wavelet transform step 108. Encoding control step 106 is also responsible for controlling the supply of a contrast scale factor (CSF) 110, weight lookup table 112, and quantization table 114 used in various steps. The CSF 110, weight lookup table 112 and quantization table 114 are supplied on a per wavelet band basis with the encoding control module supplying the information corresponding to the wavelet band (B) being processed at a given point in time. In wavelet transform step 108, a wavelet transform such as the one described in the JPEG2000 standard is used to generate wavelet transformed coefficients while at the same time performing a wavelet subdivision operation so that wavelet transformed coefficients corresponding to different wavelet filters will be output for processing on a per wavelet band basis where the variable B is used to indicate the band being output and/or processed at a given point in time.

Image level processing proceeds to band level processing. The band level processing indicated by block 117 shown using dashed lines is performed on a per band B basis, e.g., once for each band of wavelet transformed coefficients corresponding to the image 104 which are to be processed.

The wavelet transformed coefficients generated in step 108 are supplied on a per band B basis to wavelet band to codeblock subdivision step 116. In wavelet band to codeblock subdivision step 116, the wavelet transformed coefficients, corresponding to different rectangular image regions of the image represented by the coefficients, are grouped together into units referred to as codeblocks. Thus each codeblock for a given band (B) corresponds to a different rectangular image region. The wavelet transformed coefficients for band B, codeblock C are identified as $WTCs_{(B,C)}$. The coefficients corresponding to each codeblock are output and processed separately. Codeblock level process is indicated in FIG. 1 by the label L2 with the reference number 119 being used to indicate a set of codeblock level processing steps.

After separating the wavelet transformed coefficients into codeblocks in step 116 the codeblock level processing begins in quantization step 118 and integer order moment generation step 124 which may be performed in parallel. In quantization step 118, the wavelet transformed coefficients (WTCs) corresponding to codeblock B, codeword C are quantized using the quantization table 114 for the corresponding wavelet band B. The quantized wavelet transformed coefficients $QWTCs_{(B,C)}$ are then supplied to codeblock to segment subdivision step 120. In step 120 the $QWTCs_{(B,C)}$ are separated into data segments (S) corresponding to fractional bitplanes. In addition a mean squared error (MSE), in encoded image quality attributable to the data segment being encoded, is generated. This value serves as a measure of the improvement in image quality attributable to the data segment being encoded, e.g., indicating how much closer a decoded image will compare to an image which would result if all the bits of all the quantized wavelet transformed coefficients are included in the encoded image data.

Thus, in the exemplary implementation of FIG. 1, codeblock to segment subdivision step 120 produces both an MSE corresponding to codeblock C, wavelet Band B, segment S ($MSE_{(C,B,S)}$) and a corresponding fractional bitplane processing control signal $F_{B,C,S}$ used to indicate rate information relating to the fractional bitplane segment to be entropy encoded and also outputs the wavelet transformed coefficients corresponding to a segment to be subjected to entropy encoding. It is useful to note that segments at this stage of processing are not "spatial" subdivisions of codeblocks but represent fractional bitplanes, e.g., of the type used in the JPEG-2000 encoding systems. The outputs of step 120 are supplied to entropy coding step 122 which is part of the data segment level of processing L3 identified by the reference number 121. The entropy coding step 122 performs lossless entropy encoding and outputs encoded data bits representing the entropy coded wavelet transformed coefficients corresponding to each segment, e.g., fractional bitplane, output by codeblock to segment subdivision step 120. The entropy coding module also outputs rate information $R_{C,B,S}$ which indicates the encoded bit rate of the encoded bits corresponding to each fractional bitplane as the encoded bits corresponding to the bitplane are output. Thus, at the end of segmentation and entropy coding the output to be used in subsequent processing steps includes i) distortion information in the form of an MSE, rate information $R_{C,B,S}$ and entropy encoded quantized coefficients. The rate information can be used in subsequent rate allocation control step 130 when making a decision whether or not to include encoded data bits corresponding to a particular codeblock data segment in the final set of coded bits used to represent the encoded image.

At the codeblock processing level, in addition to codeblock to segment subdivision, a visual error weight, also sometimes referred to as a masking weight, is generated for the codeblock being processed in accordance with the present invention. Generation of the visual error weight includes generating at least one second order or higher integer order moment (e.g., an $n^{th}$ integer order moment where n>1) from the set of wavelet transformed coefficients $WTCs_{(B,C)}$ corresponding to the wavelet band and codeblock being processed. In various embodiments a first order moment is generated in addition to a second order moment. In some embodiments integer order moments are generated by i) raising to an integer value each of: a) at least some wavelet transformed coefficients (e.g., in the case of an even power order integer moment) or b) the absolute values of wavelet transformed coefficients, to thereby generate intermediate values and ii) computing an average of said intermediate values to produce an integer order moment value.

For example, a first order integer moment may be computed by summing the absolute values of the wavelet transformed coefficients corresponding to wavelet band B of codeblock C and then dividing the sum of absolute values by the number of coefficients included in the sum. In the case of the second order integer moment it can be generated by summing the wavelet transformed coefficients corresponding to wavelet band B after they are squared (raised to the power of two) and then dividing the sum by the number of coefficient values used to generate the sum. It should be appreciated that to address the sign issue, when generating integer moments corresponding to a power of n, where n is odd, the absolute values of the wavelet transformed coefficients corresponding to the codeblock and band being processed are used to avoid the possible effect of the sign of a coefficient affecting the coefficient value summing process. Using higher order integer moments has the effect of amplifying differences in the image making variations easier to detect and thereby facilitating detection of active regions where it may be desirable to reduce coding emphasis in favor of less active coding regions. While all the coefficients corresponding to a particular band and codeblock may be used in step 124 to generate the integer order moments, they may also be generated using less that the complete set of wavelet transformed coefficient values corresponding to a codeblock. Because the integer order moments are relatively easy to compute, the methods of the present invention do not suffer the computational complexity of other systems which rely on the use of fraction moments to perform visual masking operations.

The integer order moments generated in step 124 and filter gain value $G_B$ are supplied to weight determination step 126. Weight determination step 126 produces a visual error weight $W_{(C,B)}$ which is on a per band, per codeblock basis. In weight determination step, which is is a visual weight determination step, the integer order moments generated in step 124, the band information B and the filter gain value $G_B$ are used to determine an entry into a weight lookup table 112. In one embodiment, a fraction of the square of the first order moment divided by the second order moment is used to interpolate an intermediate value from a lookup table. In one particular embodiment, the intermediate value, the filter gain $G_B$, the band information B and said first order moment are used to generate the error output weight of step 126.

The look up table 112 may, and in some embodiments does, include a set of masking values which have been empirically determined to be beneficial for use with the particular wavelet band B being processed. Empirically determining a set of weights can be easily achieved by having a plurality of different viewers review actual images coded using different weights with the users indicating their preference in terms of coded image quality. In this manner, a set of preferred weights based on the actual human visual response can be empirically determined, stored and used for coding of subsequent images in accordance with the present invention.

In some embodiments the generated integer order moments are used to identify a visual error weight to be used, e.g., in MSE modification. The visual error weight generated in step 126 is supplied to an MSE modification step 128 which is part of the segment level processing of performed at level L3 121.

In step 128, the $MSE_{C,B,S}$ corresponding to codeblock C, band B, segment S, is modified as a function of the visual weighting factor determined in step 126, which depends at least in part, on image activity in the codeblock as a result of using the integer order moments to determine the weight. In some embodiments the MSE is also modified as a function of a contrast scale factor which is used to modify the MSE to place greater coding emphasis on low contrast image regions as compared to high contrast image regions. Also, in some embodiments, $GAMMA_B$, which is the inverse impulse response of the filter used in generating the wavelet band coefficients being processed, is used in modifying the MSE. Thus in some but not necessarily all embodiments, the inverse impulse response of the filter used in the wavelet transform step 108 is taken into consideration when modifying the MSE. While a variety of methods may be used to modify the $MSE_{C,B,S}$ as a function of the contrast scale factor, visual error weight and inverse filter impulse response, in one simple to implement embodiment the input values to step 128 are simply multiplied together to produce a weighted MSE value ($WMSE_{C,B,S}$) which is generated on a per codeblock, per band, per segment basis.

In rate allocation control step 130, an encoding module, e.g., an encoder rate allocation control module or entropy coding module, is controlled as a function of the weighted MSE ($WMSE_{C,B,S}$) to achieve a desired data rate or coding size with respect to the set of coded bits which are output as the final set of encoded bits representing the encoded image. In one embodiment in step 130, encoded data bits output by entropy coding step 122 are discarded as a function of the $WMSE_{C,B,S}$ as necessary to achieve the final coding rate objective in terms of data rate or the total size of the encoded image. As a result of the weighting by the $W_{C,B}$ generated from the integer order moments in accordance with the invention, greater emphasis will be placed by the rate allocation module on including encoded bits corresponding to regions of higher error visibility while excluding encoded bits corresponding to less visible regions, than would be included without the weighting, will be included in the final set of encoded bits output in step 132.

The encoded bits are output in step 132 to storage or a transmission module which may operate as discussed below with regard to FIG. 2. With the output of the second of coded bits representing the image which was encoded, the processing shown in FIG. 1 with regard to the image which was encoded stops. However, as should be appreciated the method of FIG. 1 may be used repeatedly, e.g., to encoded multiple images which can be stored or transmitted. The encoded image may be encoded versions of digitized images of real world objects, e.g., documents, people, buildings, etc. captured using, e.g., a camera or scanning device.

Figure 2:
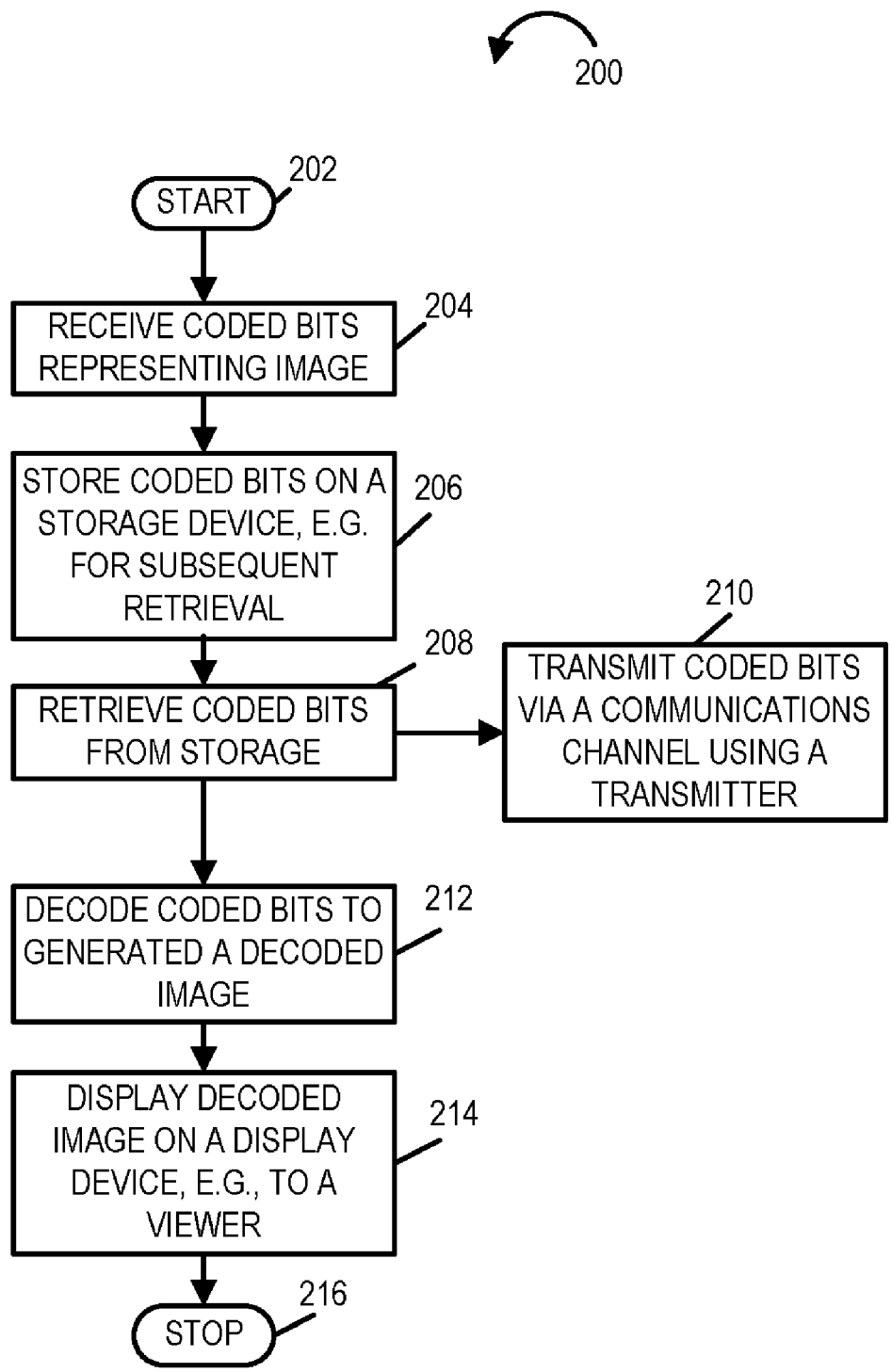
FIG. 2 illustrates a method, in accordance with the invention, of using the encoded image data generated in accordance with the method shown in FIG. 1.

FIG. 2 illustrates a method 200 involving additional processing, performed in some embodiments, on the set of encoded bits representing an image generated in accordance with the present invention. The method begins in start step 202. In step 204 the coded bits representing an image, e.g., generated by the method of FIG. 1, and sometimes referred to as encoded image data is received. In step 206 the coded bits are stored on a storage device, e.g., for subsequent retrieval. In step 208 the coded bits representation the image are retrieved form the storage device, e.g., memory, and are then either transmitted in step 210 via a transmitter into a communications channel and/or decoded in step 212 and then displayed on a display device in step 214. The method 200 stops in step 216.

FIG. 3 illustrates a computer system 300 which may be used to implement the methods shown in FIGS. 1 and 2. The computer system includes a display device 302 and an input device such as a keyboard 304 which are both coupled to an I/O interface 312. The I/O interface 312 is coupled by a bus 308 to memory 316, a processor 322 and a network interface/transmission module 324. The memory 316 includes an image processing module 318 which includes instructions for controlling the computer system 300, when executed by processor 322, to perform the steps of the methods of FIGS. 1 and 2. In some embodiments image processing module 318 includes a separate module corresponding to each individual step of the method of FIG. 1 and FIG. 2. In addition to image processing module 318, memory includes unencoded image data 320 corresponding to one or more images, e.g., grayscale images which may be encoded using the method 100 of FIG. 1 and encoded image data 321. Encoded image data 321 includes a set of coded bits representing an image which was encoded in accordance with the invention. Encoded image data corresponding to multiple images may be stored in memory 316 and can be retrieved and displayed or transmitted, e.g., in response to a user request.

Figure 4:
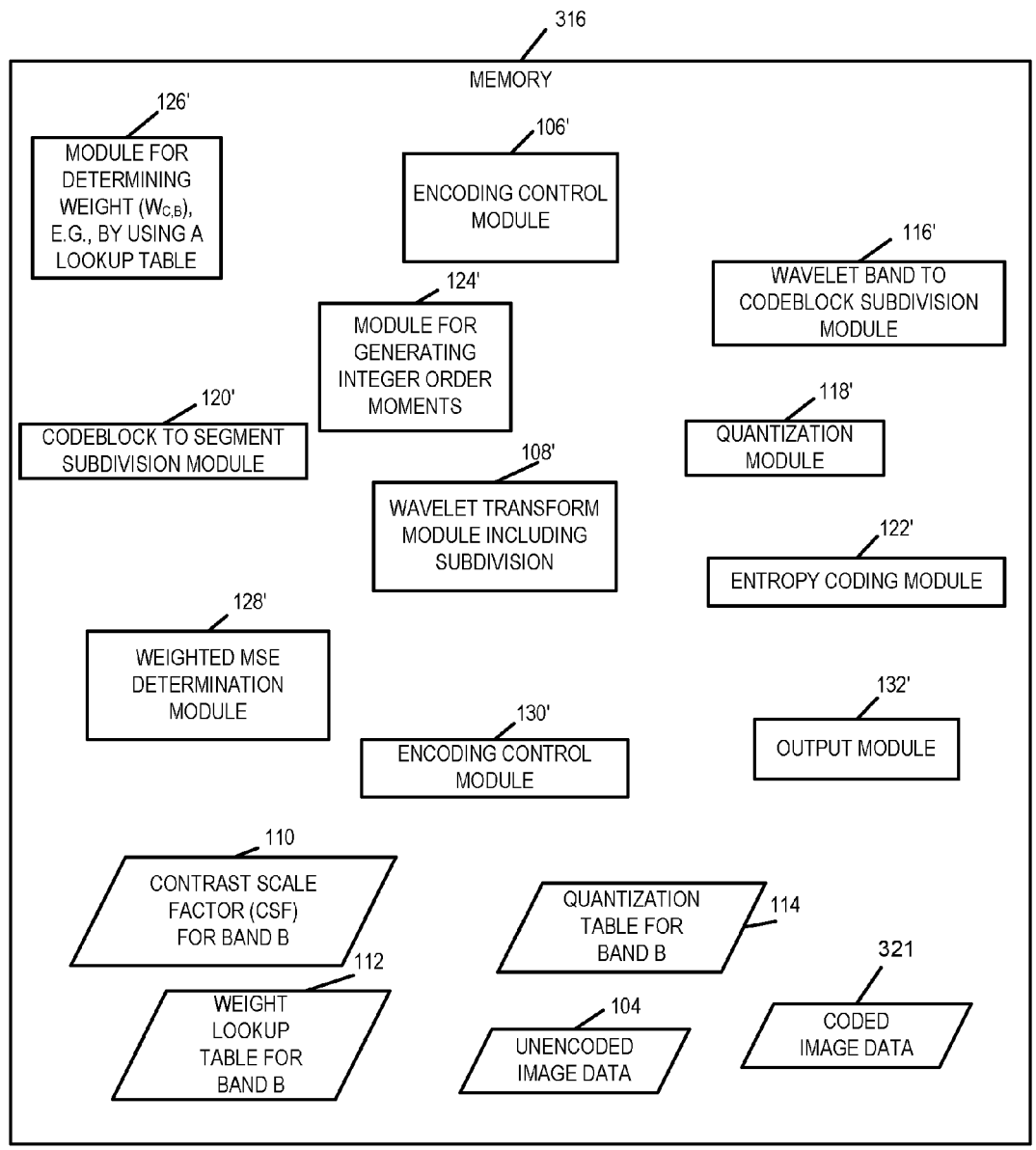
FIG. 4 illustrates a memory and various modules included therein which may be used as the memory of the system shown in FIG. 3.

FIG. 4 illustrates memory which may be used as the memory 316 shown in FIG. 3. The memory 316 may include the modules and elements shown in FIG. 3 in addition to any additional modules or elements shown in FIG. 4. For example, FIG. 4 shows the memory including modules 106', 108', 116', 118', 120', 122', 124', 126', 128', 130', and 132'. In FIG. 4 modules identified using the same reference numbers as a step shown in FIG. 1 but with a' after the number control the processor to implement the step bearing the same reference number. For example encoding control module 106' performs controls the processor, e.g., computer, 322 shown in FIG. 3 to implement the operations and/or steps described with regard to the encoding control step 106 shown in FIG. 1.

Image encoding in accordance with the invention can be implemented as an application on personal computer, workstation and/or various other general purpose types of computers wherein software including computer executable instructions control the computer, workstation or other device to implement the encoding methods of the invention including the generation of a weighted error estimate, e.g., WMSE. In view of the above discussion, it should be appreciated that the described encoding and error weighting methods are particularly well suited for use in generating JPEG 2000 compliant encoded images. It should also be appreciated that the described methods of performing JPEG 2000 encoding can be done in a relatively efficient manner with the WMSE being generated on a sub-codeblock level. The methods can be implemented using conventional general purpose computer systems, dedicated hardware or a combination of a general purpose computer and some dedicated hardware.

Various features of the present invention are implemented using modules. Such modules may, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed:

1. A method of encoding an image, the method comprising:
generating a first mean squared error estimate from wavelet transformed coefficients corresponding to said image;
generating a first visual error weight from integer order moment values generated from said wavelet transformed coefficients; and
controlling an encoder module, as a function of said first mean squared error estimate and said visual error weight signal, to produce a set of encoded bits representing said image.

2. The method of claim 1, further comprising, prior to generating said first mean squared error estimate:
performing a wavelet transform on image data representing said image to generate said wavelet transformed coefficients.

3. The method of claim 1, further comprising, prior to generating the first visual error weight, generating at least one of said integer order moment values by:
i) raising to an integer value each of: a) at least some wavelet transformed coefficients or b) the absolute values of at least some wavelet transformed coefficients, to thereby generate intermediate values;
ii) computing an average of said intermediate values to produce an integer order moment value.

4. The method of claim 1, wherein said integer order moment values includes a first order mean of the absolute values of a plurality of wavelet transform coefficients and a second order variance of said wavelet transformed coefficients.

5. The method of claim 4, further comprising, prior to generating the first visual error weight:
subdividing the wavelet transformed coefficients of a wavelet band into blocks including a first block; and
wherein said first visual error weight corresponds to said first block; and wherein generating the first visual error weight further includes generating said first order mean and said second order variance from the wavelet transformed coefficients in said first block.

6. The method of claim 5, wherein generating said first mean squared error estimate includes:
quantizing the wavelet transformed coefficients corresponding to said first block; and
processing the quantized coefficients to produce said first mean squared error estimate.

7. The method of claim 6, wherein said quantizing produces a block of quantized coefficients; and
wherein said processing the quantized coefficients to produce said first mean squared error estimate includes:
subdividing the block of quantized coefficients into a set of segments; and
generating said first mean squared error estimate from the quantized coefficients corresponding to a first segment in said set of segments.

8. The method of claim 7, further comprising:
generating a second mean squared error estimate from the quantized coefficients corresponding to a second segment in said set of segments; and
wherein said controlling an encoder is also a function of the second mean squared error estimate.

9. The method of claim 6, wherein controlling an encoder module, as a function of said first mean squared error estimate and said visual error weight signal includes:
generating a weighted mean squared error estimate as a function of said visual error weight and an inverse impulse response of a filter used to generate the wavelet transform coefficients corresponding to said first block.

10. The method of claim 9, wherein generating a weighted mean squared error estimate is performed as a function of a contrast sensitivity weight, said weighted mean squared error being generated by multiplying the visual error weight, contrast sensitivity weight and mean squared error estimate together.

11. The method of claim 4, wherein generating a first visual error weight includes:
using said first order mean and a second order variance to identify an entry in a error weight parameter lookup table; and
recovering a parameter value from the identified entry.

12. The method of claim 11, wherein generating a first visual error weight further includes:
computing said visual error weight as a function of the recovered parameter value and a nominal filter gain of a filter used to generate the wavelet transform coefficients corresponding to said first block.

13. The method of claim 4, wherein generating a first visual error weight includes:
using said first order means, and second order variance to interpolate an entry in a parameter lookup table;
retrieving an intermediate value from the lookup table by interpolation; and
using said first order means and/or second order variance and band information and a filter gain of the filter used to generate the wavelet coefficients corresponding to said first block and the wavelet band index and said intermediate value from said lookup table to compute the first visual error weight.

14. The method of claim 4, wherein generating a first visual error weight includes:
using said first order mean, a second order variance, and a gain of a filter used to generate the wavelet transform coefficients corresponding to said first block to identify an entry in a error weight parameter lookup table; and
retrieving the first visual error weight from the lookup table.

15. The method of claim 1, wherein said set of encoded bits is a JPEG 2000 compliant compressed image.

16. A non-transitory computer readable medium including computer executable instructions for controlling a computer to implement a method of encoding an image, the method comprising:
generating a first mean squared error estimate from wavelet transformed coefficients corresponding to said image;
generating a first visual error weight from integer order moment values generated from said wavelet transformed coefficients; and
controlling an encoder module, as a function of said first mean squared error estimate and said visual error weight signal, to produce a set of encoded bits representing said image.

17. A system for encoding an image, comprising:
a processor configured to:
generate a first mean squared error estimate from wavelet transformed coefficients corresponding to said image;
generate a first visual error weight from integer order moment values generated from said wavelet transformed coefficients; and
control the amount of data included in a generated set of encoded image data representing an image being encoded, as a function of said first mean squared error estimate and said visual error weight signal; and
a memory coupled to said processor.

18. The system of claim 17,
wherein said processor is further configured to perform a wavelet transform on image data representing said image to generate said wavelet transformed coefficients.

* * * * *